United States Patent [19]

Katsuma et al.

[11] Patent Number: 4,509,848

[45] Date of Patent: Apr. 9, 1985

[54] LIGHT MEASURING DEVICE FOR CAMERA

[75] Inventors: Makoto Katsuma; Akira Hiramatsu, both of Kanagawa; Kazuhiko Arakawa; Hiroyasu Murakami, both of Tokyo, all of Japan

[73] Assignee: Canon Kabushiki Kaisha, Japan

[21] Appl. No.: 462,458

[22] Filed: Jan. 31, 1983

[30] Foreign Application Priority Data

Feb. 8, 1982 [JP] Japan .................. 57-17664
Feb. 8, 1982 [JP] Japan .................. 57-17665

[51] Int. Cl.³ .................. G03B 7/099; G03B 17/20
[52] U.S. Cl. .................. 354/473; 354/478; 354/481; 354/289.1
[58] Field of Search .............. 354/53, 54–56, 354/59, 60 L, 227, 199–201, 155, 289, 219, 224, 225, 195.13, 198, 227.1, 289.12, 471–475, 289.1, 478, 481, 483

[56] References Cited

U.S. PATENT DOCUMENTS 3,218,948 11/1965 Kuppenbender ............ 354/224
3,532,043 10/1970 Shimomura et al. ........ 354/481 X
4,354,754 10/1982 Takahashi et al. .......... 354/473 X

FOREIGN PATENT DOCUMENTS 161221 12/1980 Japan .................. 354/219

Primary Examiner—William B. Perkey
Attorney, Agent, or Firm—Toren, McGeady and Stanger

[57] ABSTRACT

At least one electro-optical light shielding member is disposed close to a reticle of a photographic camera arranged for forming an image of an object to be photographed. The light shielding member is electrically controlled to have the reticle partly light-shielded by the light shielding pattern of the light shielding member in such a manner as to permit selection between an averaging light measuring mode and a spot light measuring mode.

2 Claims, 14 Drawing Figures

LIGHT MEASURING DEVICE FOR CAMERA

BACKGROUND OF THE INVENTION

1. Field of the Invention

This invention relates to a light measuring device of a photographic camera which is shiftable from one light measuring mode to another.

2. Description of the Prior Art

Heretofore, a light measuring method called TTL light measuring method in which the brightness or light quantity of an object to be photographed is measured by allowing a light flux coming from the object through a photo-taking lens to be incident upon a photo-electric transducer element has generally been practiced in varied modes including an averaging light measurement mode, a center emphasized averaging light measurement mode, a spot light measurement mode, etc. In addition to these modes, there has been known another light measuring method in which two different light fluxes are used to permit changeover between an averaging light measurement mode and a spot light measurement mode. This averaging/spot change-over light measurement method gives to a camera an advantage that a desired exposure value can be obtained by selecting either the feature of averaging light measurement or that of spot light measurement. This is convenient for photographing. However, many of the cameras of the type using this light measuring method use two discrete light sensitive elements or photo-electric elements for averaging light measurement and for spot light measurement separately from each other. For example, the photo-electric light sensitive element for averaging light measurement is disposed within a penta-prism viewfinder optical system and is arranged to perform an averaging or center-emphasized averaging light measuring action on the image of an object formed on a reticle; meanwhile, the photo-electric light sensitive element for spot light measurement is arranged through some spectral means to measure mainly the light of the middle part of the image; and an adequate degree of exposure is obtained through computation by the averaging or spot light measurement with the output of one of the two photo-electric light sensitive elements selected.

With the conventional light measuring devices arranged as described above, they have had the following drawbacks: (1) Two light sensitive elements (SPC) must be used. (2) The two light sensitive elements must be disposed within a limited space of the camera.

Meanwhile, in the case of the conventional devices of the type permitting selection between spot light measurement and averaging light measurement with use of a single light sensitive element, the selection is performed by means of a mechanical moving member. The devices of this type thus have had the following drawbacks: (3) The arrangement to mechanically perform selection results in a complex mechanism which is disadvantageous in terms of cost and space. (4) Photometric sensitivity distribution is limited by a light measuring optical system and this allows no latitude for design.

SUMMARY OF THE INVENTION

It is an object of the invention to provide a camera which obviates the above stated drawbacks of the prior art devices and in which an elecro-optical light shielding member is arranged in the vicinity of a reticle to have the reticle partly light shielded by electrically controlling the light shielding pattern of the light shielding member in such a manner as to permit selection of light measuring modes.

It is another object of the invention to provide a camera in which the light shielding pattern of a light shielding member, which is provided for light measurement, is selectively shiftable to render the light shielding member usable not only for light measurement but also for purposes other than light measurement.

These and further objects and features of the invention will become apparent from the following detailed description of preferred embodiments thereof taken in connection with the accompanying drawings.

DESCRIPTION OF THE PREFERRED EMBODIMENTS

Figure 1:
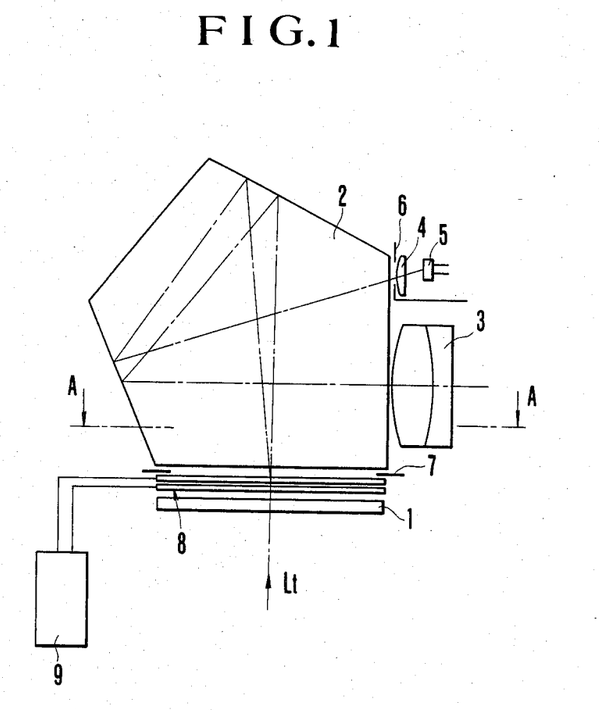
FIG. 1 is a schematic illustration showing a viewfinder arrangement of a photographic camera as an embodiment of the invention.

Referring to FIG. 1 which shows a view finder arrangement of a single-lens reflex camera as an embodiment of the present invention, the arrangement includes a reticle 1 on which a light flux coming through a photo-taking lens which is not shown is imaged through a reflection mirror which is not shown. A pentagonal roof prism 2 is disposed above the reticle 1. An eyepiece lens 3 is disposed behind the prism 2 and is arranged to permit visual observation of an image of an object to be photographed which is formed on the reticle 1. A lens 4 for light measurement is disposed above the eyepiece lens 3. Behind the light measurement lens 4 is disposed a light sensitive element 5. A light measurement mask 6 is disposed in front of the light measurement lens 4. A visual field mask 7 is disposed beneath the lower surface of the prism 2. An electro-optic light shielding member 8 which is composed of, for example, a guest-host type liquid crystal (hereinafter will be called LC for short) is disposed between the prism 2 and the reticle 1. A drive circuit 9 is provided for the light shielding member 8.

A photometric optical system is formed jointly by the light measuring lens 4, the light sensitive element 5 and the light measurement mask 6. This photometric optical system is arranged to perform an averaging light measuring action on the reticle 1 when the light shielding member 8 is not in a light shielding state.

Figure 2A:
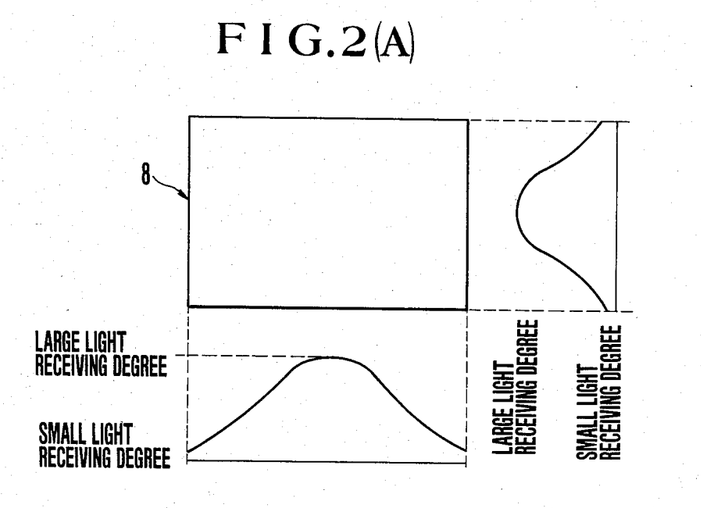
FIG. 2(A) is an illustration of a light shielding member, which is shown in FIG. 1, as in a state of being used in an averaging light measurement mode.
Figure 2B:
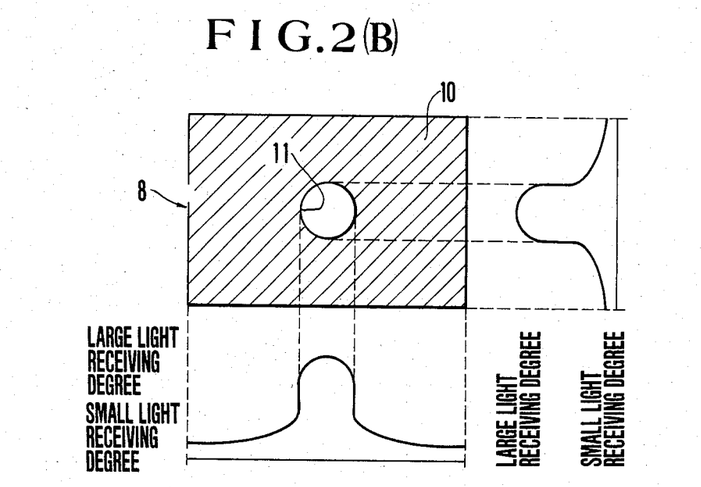
FIG. 2(B) is an illustration of the light shielding member as in a state of being used in a spot light measurement mode.
Figure 2C:
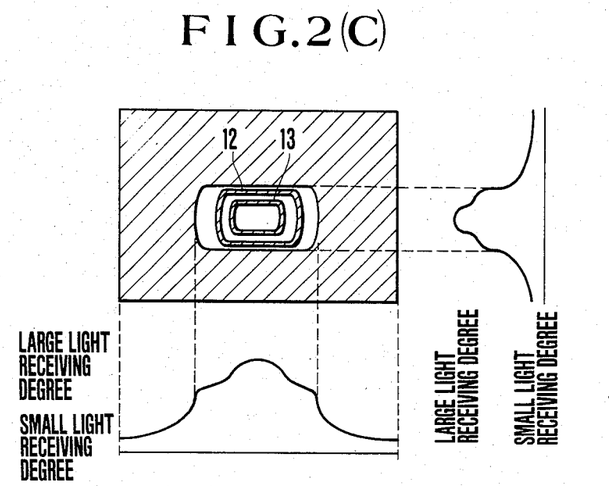
FIG. 2(C) is an illustration of a first modification example of the light shielding member shown in FIG. 1.
Figure 2D:
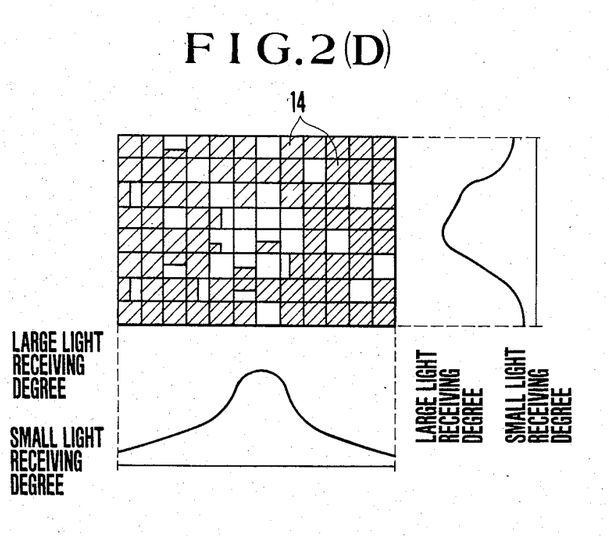
FIG. 2(D) is an illustration of a second modification example of the light shielding member shown in FIG. 1.

The photometric sensitivity distribution of the photometric optical system is as shown in FIG. 2(A) when the light shielding member 8 is not in operation and is as shown in FIG. 2(B) when the electro-optic light shielding member 8 is in operation. As viewed on line A—A of FIG. 1, a hatched part 10 of FIG. 2(B) represents the light shielding part. As shown in FIG. 2(B), a part 11 which is not light shielding has a high light receiving degree to permit spot light measurement. The position and the shape of the light shielded part 10 is variable as desired by changing the transparent electrode pattern of the guest-host type liquid crystal cell which forms the light shielding member 8. It is also possible to weight the light shielding state of the light shielding member 8 as shown in FIG. 2(C) or in FIG. 2(D) which represents an example in which weighting is effected by a random dotted pattern 14. While the use of the guest-host type liquid crystal cell (GH-LC) for the light shielding member has been mentioned above, the invention is not limited to that but the light shielding member may be selected out of other electro-optic elements such as an electrochromic (EC), etc.

Figure 3:
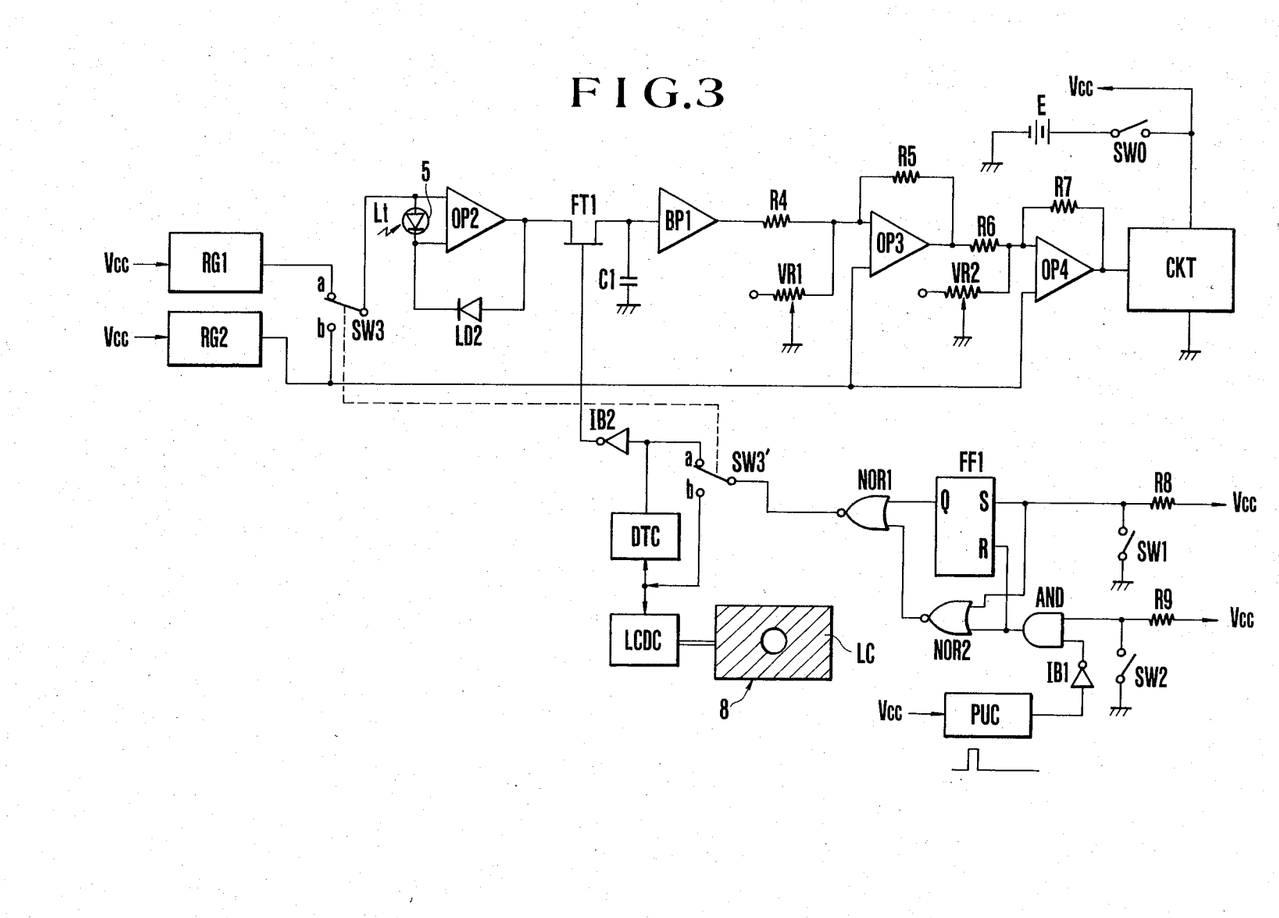
FIG. 3 is an electrical circuit diagram of the camera which is provided with the view finder arrangement of FIG. 1.

Referring now to FIG. 3 which shows the electric circuit of a single-lens reflex camera using the view finder arrangement of FIG. 1, reference numerals 5 and 8 indicate respectively the light sensitive element and the light shielding member shown in FIG. 1. The circuit includes change-over switches SW3 and SW3' which are provided for selection between a spot light measurement mode and an averaging light measurement mode. These switches are shown in FIG. 3 in a state where the switches have been shifted to the averaging light measurement mode. Under this condition, the light shielding member 8 shows a part (hatching part) which is light shielded by the liquid crystal cell LC. However, the member 8 is not light shielded at the time of averaging light measurement.

The circuit comprises operational amplifiers OP-2-OP4; a buffer amplifier BP1; variable resistors VR1 and VR2 for inputs of photographic information; a capacitor C1 for storing; a photo-electric conversion element 5 for light measurement; a diode LD2; an analog gate FT1; constant voltage sources RG1 and RG2 for producing two different reference voltages which are to be used for adjustment of the level of the operational amplifier OP2; a power source battery E; an exposure control circuit CKT which is arranged to control either shutter time or an aperture value; inverters IB1 and IB2; a circuit LCDC for driving the liquid crystal LC; a delay circuit DTC; the liquid crystal LC which is of the guest-host type; on-off switches SW0-SW2; and change-over switches SW3 and SW3'. The switch SW0 is a power source switch which is arranged to turn on in response to the first step operation of a shutter release button. The switch SW1 is a release switch which is arranged to turn on in response to the second step operation of the release button. The switch SW2 is a timing switch which is arranged, for example, to turn off in response to a film winding action and to turn on upon completion of travel of the trailing curtain of a shutter. The camera further includes an RS type flip-flop FF1; a single pulse generator PUC which is arranged to stabilize the flip-flop FF1 by producing a short pulse at the time of the rise of a power supply effected with the switch SW0 turned on; NOR gates NOR1 and NOR2; and an AND gate AND.

Figure 4:
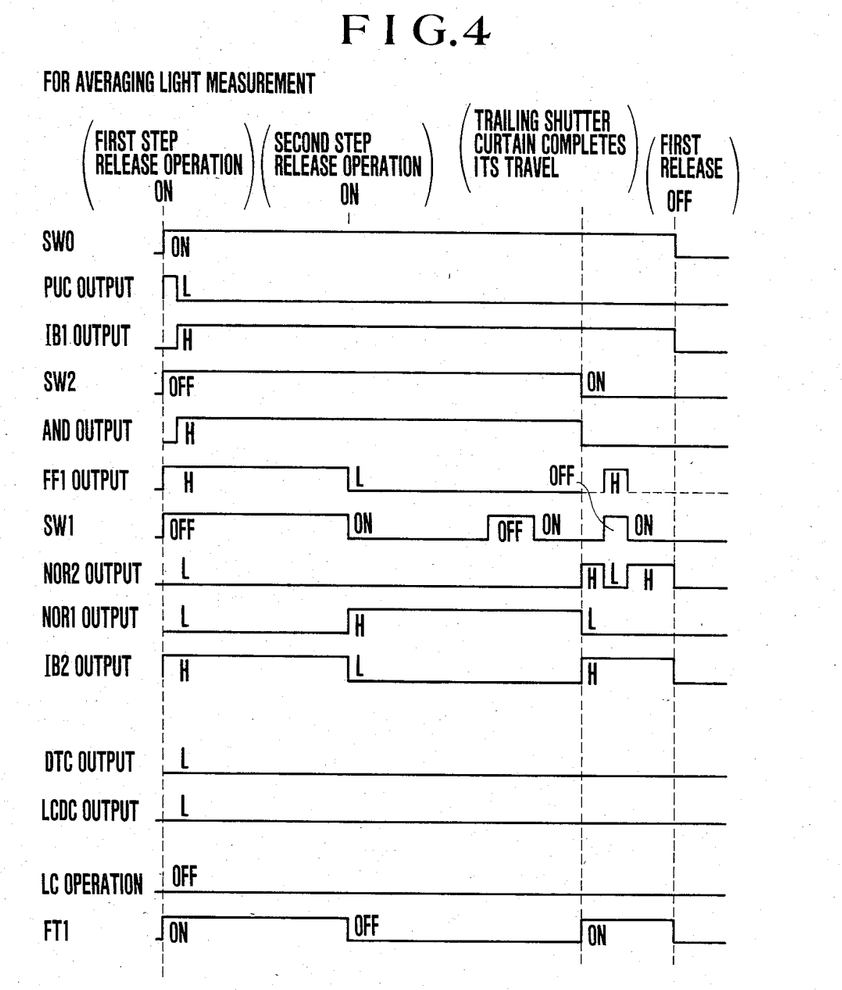
FIG. 4 is a time chart showing the operation of the circuit of FIG. 3 in an averaging light measurement mode.
Figure 5:
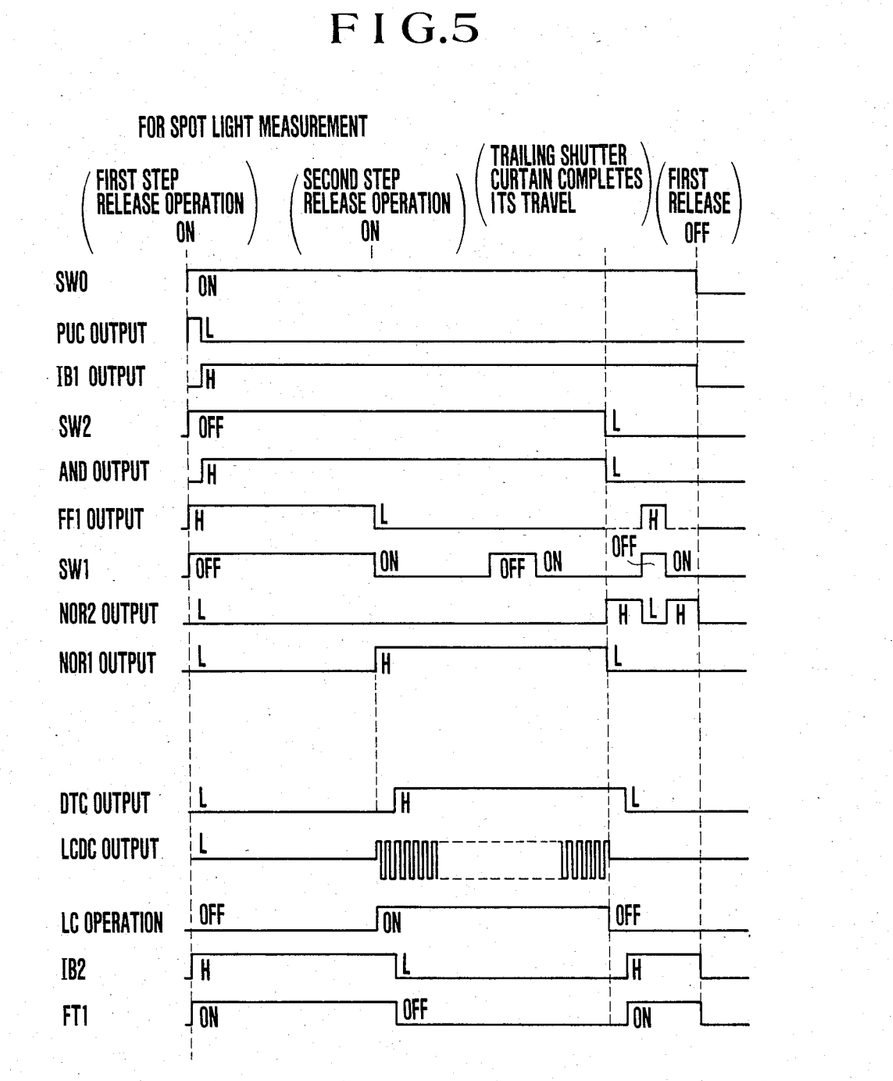
FIG. 5 is a time chart showing the operation of the circuit of FIG. 3 in a spot light measurement mode.

Next, the operation of the circuit arrangement of the camera which is as described above will be described below with reference to the time charts of FIGS. 4 and 5:

At the time of averaging light measurement, the operation is as follows: The switches SW3 and SW3' are switched to their positions as shown in FIG. 3. Following that, when the release button (not shown) of the camera is depressed, the power source switch SW0 turns on as shown in FIG. 4 in response to the first step of the depressing operation. With the switch SW0 turned on, the light measuring circuit begins to operate. The single pulse generator PUC then produces one pulse. The pulse is applied to the AND gate AND through the inverter IB1. A low level (hereinafter will be called L for short) output of the AND gate AND is then applied to the reset terminal R of the flip-flop FF1 to bring thereby the flip-flop FF1 into a stable state in which it produces an output of a high level (hereinafter will be called H). The output of the NOR gate NOR1 therefore becomes L. The L output of the NOR gate is inverted by the inverter IB2 and is then supplied to the analog gate FT1. At the photoelectric or light sensitive element 5, a photo current is produced by a light flux Lt which comes from the object to be photographed. The photo current is logarithmically suppressed by the operational amplifier OP2 which is provided with a diode LD2 of a logarithmic characteristic. An output of the operational amplifier OP2 which is thus obtained is supplied through the analog gate FT1 to the capacitor C1 to charge it therewith. When the second step of the depressing operation on the release button causes the release switch SW1 to turn on, the level of the set terminal S of the flip-flop FF1 becomes L. At that time, since the switch SW2 remains off, the output of the output terminal Q of the flip-flop FF1 becomes L and is latched in that state. This L output is applied through the NOR gate NOR2 to the NOR gate NOR1 to cause the output of the NOR gate NOR1 to become L. Therefore, the analog gate FT1 has an L input and is thus turned off. Accordingly, information (Bv−Avo−Avc) obtained through computation of information Bv on the brightness of the object to be photographed with information Avo on the full-open F number of the lens in use and information Avc on the full-open curvature is stored at the capacitor C1. The information Bv−Avo−Avc is supplied to the operational amplifier OP3 through the buffer amplifier BP1 and the resistor R4.

Further, with a setting operation made at the variable resistor VR1, the full-open curvature information Avc of the lens is supplied to the operational amplifier OP3. These values of information is computed by the operational amplifier OP3. The computation output thus obtained is supplied to the operational amplifier OP4. At the input terminal of the operational amplifier OP4, there has been received photographic information set at the variable resistor VR2, such as the setting aperture value information Av of the lens and film sensitivity information Sv. These values of information are computed at the operational amplifier OP4, which then produces information $(Bv-Avo-Avc)+Avc+Sv+Av=Tv$ as output information thereof. An appropriate exposure is performed by controlling the control circuit CKT on the basis of the above stated information Tv.

The operation in the case of spot light measurement is as follows: Using a change-over member which is not shown but is provided for obtaining the spot light measurement mode, the switches SW3 and SW3' are switched to the spot light measurement mode. Then, the use of the constant voltage source PG1 of the reference voltage for average light measurement is shifted to the use of another constant voltage source PG2 of the reference voltage for spot light measurement. The output level of the operational amplifier OP2 is then determined by the constant voltage source PG2. These constant voltage sources PG1 and PG2 have been adjusted beforehand in such a manner that the level of the light measurement output of the operational amplifier OP2 remains unvarying in both the spot and averaging light measurement modes for the same brightness diffusing surface.

When the switch SW0 is caused to turn on in the same manner as in the case of averaging light measurement, one pulse is produced from the single pulse generator PUC. The output level of the output terminal Q of the flip-flop FF1 becomes H and the output is latched in that state. The outputs of the NOR gate NOR2 and the flip-flop FF1 cause the output of the NOR gate NOR1 to become L. The L output becomes H through the delay circuit DTC and the inverter IB2. The H signal thus obtained is supplied to the analog gate FT1. Meanwhile, the L output of the NOR gate NOR1 is supplied also to the circuit LCDC which is provided for driving the liquid crystal cell LC. With the H signal supplied to the circuit LCDC, the circuit LCDC produces an alternating current pulse voltage for driving the liquid crystal cell LC. The circuit, however, does not drive the liquid crystal cell LC when the level of the input signal thereto is L. The light Lt from the object to be photographed causes the photo-electric element 5 to produce a photo current. Then, in the same manner as in the case of averaging light measurement, the capacitor C1 is charged with the output of the operational amplifier OP2 through the analog gate FT1. When the release switch SW1 turns on in response to the second step of a depressing operation on the release button, the level of the set terminal S of the flip-flop FF1 becomes L and the output level of the output terminal Q thereof becomes L. Since the switch SW2 remains off at that time, the output of the output terminal Q of the flip-flop FF1 remains latched in the state of L even when the level of the set terminal S of the flip-flop is caused to become H with the release switch SW1 turned off. Since the output level of the NOR gate NOR2 is L, the output of the NOR gate NOR1 is latched in a gate of H. When the output level of the NOR gate NOR1 is caused to become H by the release switch SW1, the LC driving circuit LCDC drives the liquid crystal cell LC to partially light shield it for spot light measurement. The capacitor C1 is then light shielded by the liquid crystal cell LC and is thus caused to store information on the object's brightness which is measured in the spot light measurement mode. After the liquid crystal cell LC is driven, the H output of the NOR gate NOR1 is delayed for a certain length of time by the delay circuit DTC. Then, the H level signal thus produced through the delay circuit DTC is inverted into an L signal through the inverter IB2 and is supplied to the analog gate FT1. This causes the analog switch FT1 to turn off. Information $(Bvs-Avo-Avc)$ obtained from object's brightness information Bvs measured in the spot light measurement mode by computing the full-open F number information Avo of the lens in use and the full-open curvature information Avc of the lens is stored at the capacitor C1. The information $Bvs-Avo-Avc$ is supplied to the operational amplifier OP3 through the buffer amplifier BP1 and the resistor R4. After that, the operational amplifier OP4 produces information $(Bvc-Avo-Avc)+Avc+Sv+Av=Tv$ in the same manner as in the case of the averaging light measurement mode. The information Tv thus produced is supplied to the control circuit CKT for an appropriate exposure.

With a series of exposure controlling actions performed by the control circuit CKT, the switch SW2 turns on upon completion of the opening and closing operation of the shutter. With the switch SW2 turned on, the level of the reset terminal R of the flip-flop FF1 becomes L. Then, if the release switch SW1 is off, the level of the set terminal S of the flip-flop FF1 is H. Therefore, the output level of the output terminal Q of the flip-flop FF1 becomes H. This causes the output level of the NOR gate NOR1 to become L. The L output of the NOR gate renders the liquid crystal cell driving circuit LCDC inoperative and the liquid crystal cell LC is no longer light shielded. Further, the output of the NOR gate NOR1 causes the analog gate FT1 to turn on through the delay circuit DTC and the inverter IB2 and thus the storing and holding action is released. Further, if the release switch SW1 is on, the level of the set terminal S of the flip-flop FF1 becomes L to render the flip-flop unstable. However, since the output level of the NOR gate NOR2 then becomes H, the output level of the NOR gate NOR1 becomes L to result in the same condition as in the case of averaging light measurement.

In the case of the specific embodiment described above, the invention is applied to a camera of the shutter preference type. However, the invention is not limited to the camera of that type but is of course also readily applicable to cameras of other types such as the aperture preference type and the programmed type.

Further, in the embodiment described above, light shielding is effected with the electro-optical light shielding member only for spot light measurement. However, in accordance with the invention, it is also possible to make weighting to have a light shielding portion and a portion not light shielding also for averaging light measurement. In such a case, automatic exposure control can be accomplished by performing a light shielding action after a release operation and by performing light measurement in the same manner as in the spot light measurement mode described in the foregoing. Further, in such a case, arrangement to form a pattern in such a manner as to obtain the same output level of the light sensitive element both in the spot and averaging light measurement modes for the same diffuse brightness obviates the necessity of having an electrical circuit for adjustment of an output difference. This is an advantage.

As has been described in detail, in the embodiment of the invention, the provision of the electro-optical light shielding member in the vicinity of the focal plane permit change-over between averaging light measurement and spot light measurement by partially light shielding the focal plane. The invented arrangement gives the following advantages:

(1) The use of a liquid crystal LC or an electrochromic (EC) as the electro-optical light shielding member permits simplification of construction. This is an advantage in terms of space and cost.

(2) Design work can be carried out easily without any major changes in the currently practiced optical arrangement, optical technique and actual manufacture.

(3) The invented arrangement is compatible with a display (superimposed) within a viewfinder image plane.

(4) Photometric sensitivity distribution can be readily changed as desired by just changing the shape of the light shielding portion of the electro-optical light shielding member and the sensitivity distribution can be almost unconditionally determined by the shape of the light shielding portion.

(5) During the process of an exposure, the reticle is partially light shielded by the electro-optical light shielding member disposed close to the reticle in the case of spot light measurement. Therefore, the adverse effect of a leak of rays of light due to a reverse incident light on the view-finder can be lessened.

Figure 6:
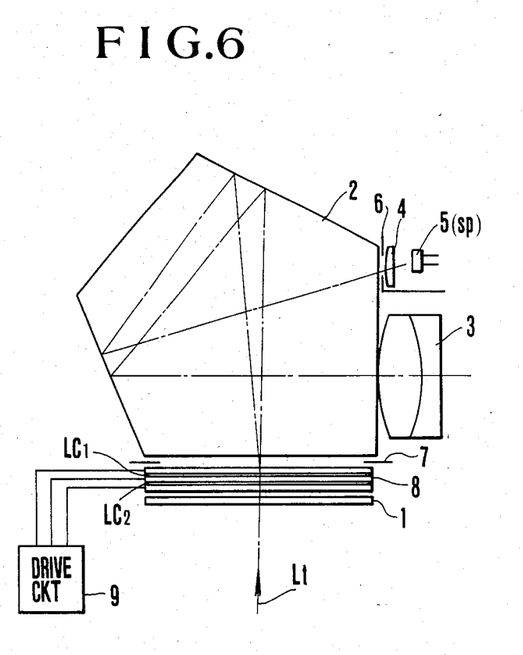
FIG. 6 is a schematic illustration showing a view finder arrangement as another embodiment of the invention.

Another embodiment of the invention is arranged as shown in FIG. 6, which shows a viewfinder arrangement of a single-lens reflex camera. In FIG. 6, parts identical with the parts shown in FIG. 1 are indicated by the same reference numerals and symbols as those indicated in FIG. 1. Detailed description of such parts will be omitted from the following description, which will cover only the points in which the embodiment differes from the preceding example of embodiment: The light shielding member is composed of a plate like guest-host liquid crystal of a two-layer construction which is arranged by inserting and sealing a liquid crystal matter and a dye in between three flat glass plates having transparent electrodes. The light shielding member 8 thus includes a liquid crystal LC1 which is of a pattern as shown in FIG. 7 and is disposed on the side of the pentagonal roof prism 2 and another liquid crystal cell LC2 which is of a pattern as shown in FIG. 8 and is disposed on the side of the reticle 1.

Figure 7:
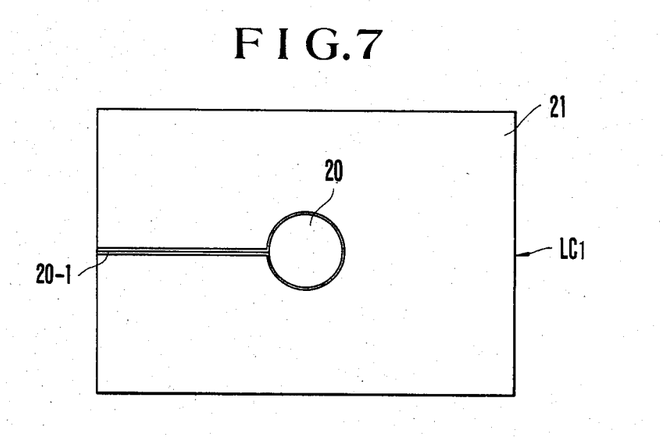
FIG. 7 is a detail view of a liquid crystal cell LC1 which is shown in FIG. 6.

Referring to FIG. 7, spot light measurement can be performed by rendering the liquid crystal cell LC1 operative to make a pattern portion 20 into a transmission part and another pattern portion 21 into a light shielding part and thus by allowing the light sensitive element 5 of the light receiving optical system to measure a light passed through the pattern portion 20.

Figure 8:
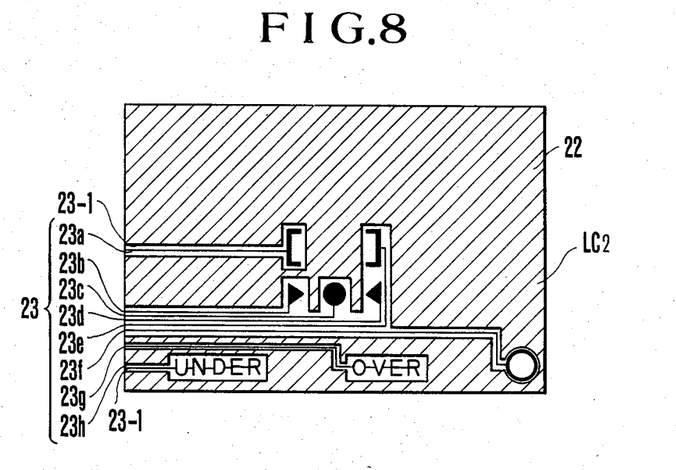
FIG. 8 is a detail view of another liquid crystal cell LC2 shown in FIG. 6.

Meanwhile, the pattern arrangement of the liquid crystal cell LC2 shown in FIG. 8 includes various warning display, distance measurement mark and focus displays patterns 23, 23a–23h and a pattern 22 which covers the remaining part as indicated by hatching. The patterns 23a–23h serve to make displays within the viewfinder in according with the outputs of a warning determination circuit and a focusing state determination circuit respectively. Further, the patterns 20 and 23a–23h are provided with leading patterns 20-1 and 23-1 respectively. However, since these leading patterns are very small and of course can be arranged either to be invisible or to be turned off without providing opposed electrodes.

Further, the two layers of the light shielding member 8 are respectively oriented to have a polarizing angle of 90°. It is possible to have almost the whole surface of the view-finder light shielded with contrast intensified by turning on all the patterns 20, 21, 22 and 23, so that a reverse incident light from the eyepiece lens 3 can be cut off thereby.

Figure 9:
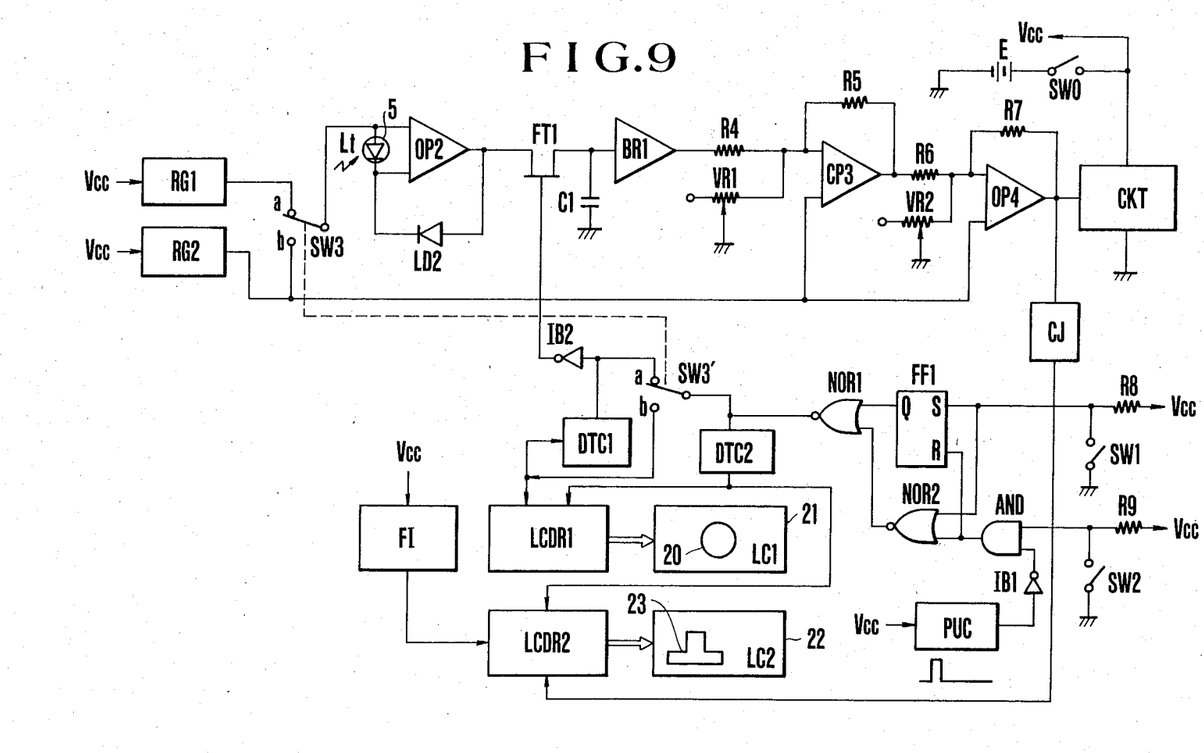
FIG. 9 is an electric circuit diagram of a camera which is provided with the view finder arrangement of FIG. 6.

FIG. 9 shows the electric circuit arrangement of the single-lens reflex camera which is equipped with the view finder arrangement shown in FIG. 6. In FIG. 9, the same parts that are identical with corresponding parts shown in FIG. 3 are indicated with the same reference numerals and symbols. Detailed description of such parts is omitted from the following description which covers only the different points of the circuit arrangement of this camera.

Referring to FIG. 9, the circuit arrangement includes the light sensitive element 5 and the liquid crystal cells LC1 and LC2 which are shown in FIG. 6; delay circuits DTC1 and DTC2; a driving circuit LCDR1 for driving the light measuring liquid crystal cell LC1; a driving circuit LCDR2 for driving the display liquid crystal cell LC2; a focusing condition determination circuit F1; and a determination circuit CJ which is arranged to give a warning.

Figure 10:
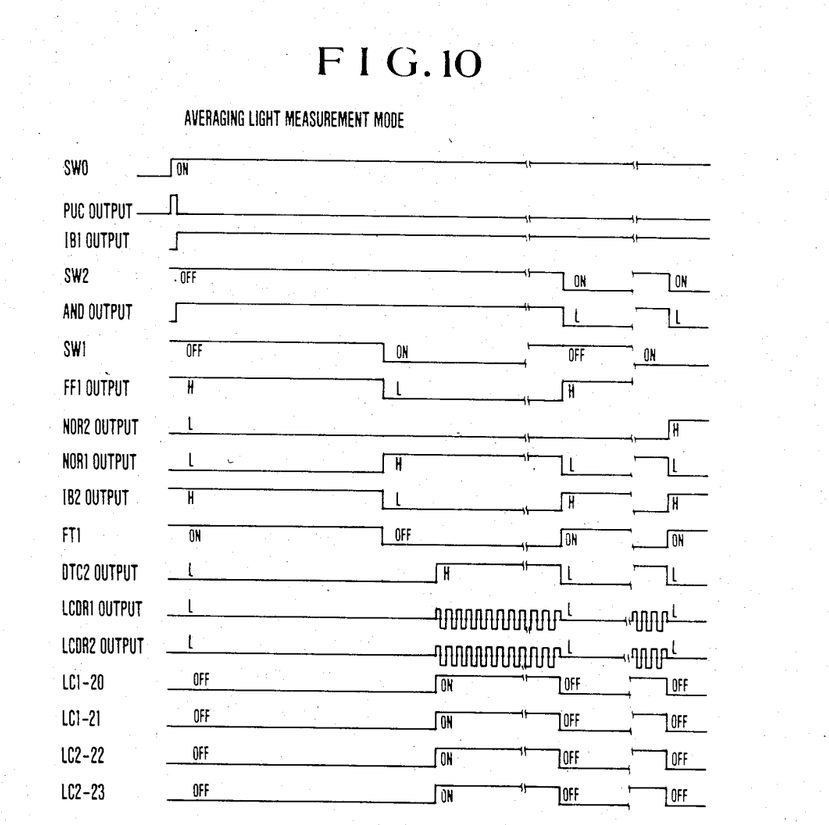
FIG. 10 is a time chart showing the operation of the circuit of FIG. 9 in an averaging light measurement mode thereof.

Referring now to FIG. 10 which is a time chart, the circuit arrangement operates as follows: First, in the case of averaging light measurement, the switches SW3 and SW3' are shifted to positions as shown in FIG. 9. After that, when the shutter release button (not shown) of the camera is depressed, the power source switch SW0 turns on in response to the first step of the depressing operation as shown in FIG. 10. With the switch SW0 thus having been turned on, the photometric or light measurement circuit begins to operate. Meanwhile, the single pulse generator PUC produces one pulse. This pulse if applied to the AND gate AND through the inverter IB1. The low level (L) output of the AND gate AND is then applied to the reset terminal R of the flip-flop to bring the flip-flop FF1 into a stable state producing a high level (H) output therefrom. Accordingly, the output level of the NOR gate NOR1 becomes L. The L output is inverted by the inverter IB2 and is supplied to the analog gate FT1. A light Lt from the object to be photographed causes the light sensitive element 5 to produce a photo current. The photo current is then logarithmically suppressed by the operational amplifier OP2 which is provided with the diode LD2 of a logarithmic characteristic. An output of the operational amplifier OP2 which is thus obtained is supplied to the capacitor C1 through the analog gate FT1 to charge the capacitor therewith. When the release switch SW1 is turned on by the second step depressing operation on the release button, the level of the set terminal S of the flip-flop FF1 becomes L. Then, since the switch SW2 remains off at that time, the output level of the output terminal Q of the flip-flop FF1 becomes L and is latched. The L output of the flip-flop is applied to the NOR gate NOR1 through the NOR gate NOR2. The output level of the NOR gate NOR1 becomes H. This results in an L input to the analog gate FT1 to turn off the analog switch FT1. Then, at the capacitor C1, there is stored and held computed information $Bv - Avo - Avc$ which is obtained by computing full-open F number information Avo on the lens in use and information Avc on the full-open curvature of the lens from information Bv on the brightness of the object. The information Bv−Avo−Avc is supplied to the operational amplifier OP3 through the buffer amplifier BP1 and the resistor R4.

Further, full-open curvature information Avc on the lens which is set at the variable resistor VR1 is also supplied to the operational amplifier OP3. The operational amplifier OP3 computes these values of information. The computation output thus obtained is supplied to the operational amplifier OP4. Meanwhile, at the input terminal of the operational amplifier OP4, there have been supplied photographic information set at the variable resistor VR2, such as information Av on the setting aperture value of the lens and film sensitivity information Sv. These values of information are computed at the operational amplifier OP4, which then produces an information output (BV−Avo−Avc)+Avc+Sv+Av=Tv. The control circuit CKT is then controlled on the basis of this output Tv for an appropriate exposure.

The operation in the spot light measurement mode is as follows: A change-over member (not shown) provided for selection of the spot light measurement mode is operated to shift the switches SW3 and SW3' to their positions for the spot light measurement mode. Then the use of the constant voltage source RG1 for averaging light measurement reference is shifted to the constant voltage source for spot light measurement reference. After that, the output level of the operational amplifier OPE is determined by the constant voltage source RG2.

Meanwhile, these constant voltage sources PG1 and PG2 have been adjusted beforehand in such a manner that the light measurement output of the operational amplifier OP2 is at the same level both in the spot light measurement mode and in the averaging light measurement mode for the same brightness diffusing surface.

Figure 11:
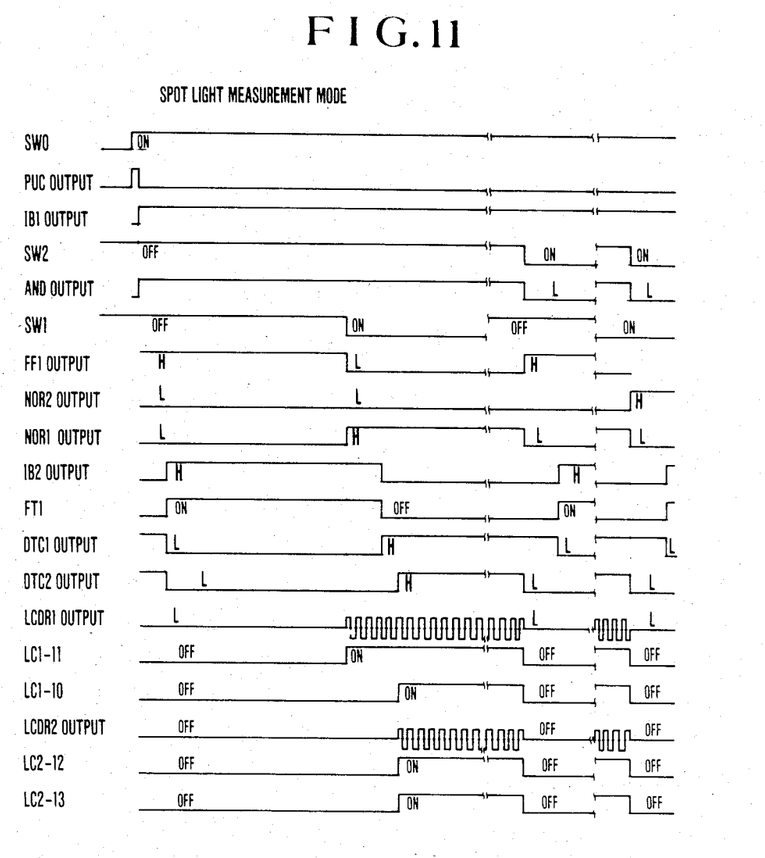
FIG. 11 is a time chart showing the operation of the circuit of FIG. 9 in a spot light measurement mode thereof.

Then, when the switch SW0 is turned on in the same manner as in the averaging light measurement mode, one pulse is produced by the single pulse generator PUC as shown in FIG. 11. This causes the output level of the output terminal Q of the flip-flop FF1 to become H. The output of the NOR gate NOR2 and that of the flip-flop FF1 cause the output level of the NOR gate NOR1 to become L. This L output of the NOR gate NOR1 becomes H through the delay circuit DTC1 and the inverter IB2. The H signal thus obtained is supplied to the analog gate FT1. Further, the L output of the NOR gate NOR1 is supplied also to the circuit LCDR1 for driving the liquid crystal LC1. This circuit LCDR1 is arranged such that it drives the pattern 21 of the liquid crystal cell LC1 when an H signal is supplied to the circuit. If the level of the input signal is L, the circuit LCDR1 does not drive the pattern 21 of the liquid crystal cell LC1. A light Lt from the object to be photographed causes the light sensitive element 5 to produce a photo current. Then, in the same manner as in the averaging light measuring mode, the capacitor C1 is charged with the output of the operational amplifier OP2 which is supplied thereto through the analog gate FT1. When the release switch SW1 turns on in response to the second step operation on the release button, the level of the set terminal S of the flip-flop FF1 becomes L to result in an L output of the output terminal Q of the flip-flop FF1. Since the switch SW2 remains off at that time, the output of the output terminal Q of the flip-flop FF1 is latched and remains at L even when the level of the set terminal S of the flip-flop becomes H with the release switch SW1 turned off. Since the level of the output of the NOR gate NOR2 is L, the output of the NOR gate NOR1 is latched in an H state. When the output level of the NOR gate NOR1 is caused to become H by the release switch SW1, the driving circuit LCDR1 for driving the liquid crystal cell LC1 drives the pattern 21 to permit spot light measurement by partially shielding the light. The capacitor C1 stores information on the brightness of the object which is measured through the partial light shielding effected by the pattern 21 of the liquid crystal cell LC1. After the pattern 21 of the liquid crystal cell LC1 has been driven, the H output of the NOR gate NOR1 is delayed for a certain length of time by the delay circuit DTC1. An H signal thus produced from the delay circuit DTC1 is inverted into an L signal through the inverter IB2 and then is supplied to the analog gate FT1. This turns off the analog switch FT1. With the analog switch turned off, the capacitor C1 stores and holds information Bvs−Avo−Avc which is obtained by computing information Avo on the full-open F number of the lens in use and information Avc on the full-open curvature of the lens from information Bvs on the object's brightness measured by the spot light measurement. The information Bvs−Avo−Avc is supplied to the operational amplifier OP3 through the buffer amplifier BP1 and the resistor R4. Following that, an output of the operational amplifier OP4 is obtained as information (Bvs−Avo−Avc)+Avc+Sv+Av=Tv in the same manner as in the case of the averaging light measurement mode. The information Tv produced from the operational amplifier OP4 is supplied to the control circuit CKT for an appropriate exposure.

Upon completion of the shutter opening-and-closing operation after a series of exposure control actions by the control circuit CKT, the switch SW2 turns on. With the switch SW2 turned on, the level of the reset terminal R of the flip-flop FF1 becomes L. Then, since the level of the set terminal S of the flip-flop is H if the release switch SW1 is off, the output level of the output terminal Q of the flip-flop FF1 becomes H. The output level of the NOR gate NOR1 becomes L to render the liquid crystal cell LC1 driving circuit LCDR1 inoperative and the pattern 21 of the liquid crystal cell LC1 ceases to perform the light shielding action thereof. Further, the output of the NOR gate NOR1 causes the analog gate FT1 to turn on through the delay circuit DTC1 and the inverter IB2. Then, the information storing and holding action is released. In the case where the release switch SW1 is on, the level of the set terminal S of the flip-flop becomes L to render the flip-flop FF1 unstable. However, since the output level of the NOR gate NOR2 becomes H, the output level of the NOR gate NOR1 becomes L to give the same result as the result mentioned above.

After a shutter release action, irrespective as to whether it is in the averaging light measurement mode or in the spot light measurement mode, the output of the NOR gate NOR1 comes, through a delay time of the delay circuit DTC2 which is longer than that of the other delay circuit DTC1, to cause the circuits LCDR1 and LCDR2 to drive the patterns 20 and 21 and the patterns 22 and 23 respectively to light shield the viewfinder. This light shielding action serves as a shutter for the eyepiece lens 3. Under this condition, when the switch SW2 is turned on, the light shielding action is terminated with the liquid crystal cells LC1 and LC2 stopped from being driven any longer in the same manner as in the case of the spot light measurement mode. (Further, in this instance, if sufficient sensitivity distribution is obtainable for spot light measurement by the use of only the patterns 20 and 21 of the liquid crystal cell LC1, it is not necessary to drive the patterns 22 and 23).

Further, at the time of ordinary light measurement, the determination circuit CJ judges the output signal of the operational amplifier OP4 to determine whether it requires a warning against deviation from a controllable range or against the possibility of blurring by shaking of hands. An output of the circuit CJ thus obtained is supplied to the circuit LCDR2 to cause the latter to drive the liquid crystal cell LC2 to make a superimposed display by means of the pattern 23 within the viewfinder.

Meanwhile, a distance measurement information produced from the determination circuit FI is arranged also to be supplied to the circuit LCDR2 to cause it to drive the liquid crystal cell LC2 to make a superimposed display of a distance measurement state by means of the pattern 23 within the viewfinder.

In the embodiment described above, the invention is applied to an automatic exposure (AE) camera of the aperture preference type. However, it goes without saying that the invention is applicable also to cameras of other types including an AE camera of the shutter preference type and an AE camera of the programmed type. Further, in the specific embodiment described above, shifting to the spot light measurement mode is arranged to be effected after a shutter release action for the purpose of preventing the visual field of the viewfinder from becoming too dark. However, it is also possible to make a display of a spot light measurement range prior to a release action.

As has been described in the foregoing, in the embodiment of the invention, a two-layer electro-optical light shielding member is arranged close to a reticle to permit simplification of construction. It is an advantage that the change-over between the spot and averaging light measurement modes, the action to provide an eyepiece shutter and the superimposed display within the viewfinder can be simultaneously accomplished with the simple construction. The invention thus permits the manufacture of an easily observable viewfinder which is servable for many purposes and is advantageous in terms of space and cost. It is another advantage of the embodiment that design work can be carried out easily without necessitating any major changes in the currently practiced optical arrangement, optical technique and actual manufacturing arrangement.

In addition to the above stated advantages, it is a further advantage of the invention that, with the two-layers of the electro-optical light shielding member arranged for the purpose of light measurement mode selection and for the purpose of making the superimposed display, light shielding rate can be enhanced by simultaneously operating the two-layers in preventing a reverse incident light from the eyepiece.

What we claim:

1. A single-lens reflex camera comprising:
   a reticle arranged to allow a light flux coming from an object to be photographed through a photo-taking lens to be imaged thereon;
   an electro-optical element of two-layer construction disposed close to said reticle, one layer of said element being arranged to be shiftable between a partially light-shielding state and a non-light-shielding state for shifting a light measuring range, the other layer of the element being arranged to be shiftable between a partially light-shielding state and a non-light-shielding state for the purpose of making displays within a view finder;
   control means for controlling the conduction of the first and second layers of said electro-optical element in time-displaced relation, said means operating in three time divisions for display, light metering and exposure, so that when displaying, the second layer is rendered conducting to present a finder display, when metering light, the first layer is rendered conducting in the spot-metering mode, and non-conducting in the average metering mode to perform light metering, and when making an exposure, the first and second layers are rendered conducting, so that said electro-optical element is made in the light shielding state;
   view finder optical means for confirmation of an image of the object formed on said reticle through said electro-optical element, said optical means being arranged to make a display within a view finder by selecting the state of the other layer of said electro-optical element between the light-shielding state and the on-light-shielding state thereof; and
   a light sensitive element arranged to measure the brightness of an image of said object formed on said reticle through said electro-optical element, the light measuring range of said light sensitive element being arranged to be shiftable according to the selection between said light-shielding state and said non-light-shielding state of the first layer of said electro-optical element.

2. A camera according to claim 1, wherein said electro-optical element is a liquid crystal of the guest-host type and is arranged in two-layers.

* * * * *